(12) United States Patent
Andrus et al.

(10) Patent No.: US 8,447,361 B1
(45) Date of Patent: May 21, 2013

(54) DYNAMIC INTERACTIVE SKIN

(75) Inventors: Scott M. Andrus, Prior Lake, MN (US);
Kevin W. Jones, St. Louis Park, MN (US)

(73) Assignee: AT&T Mobilty II LLC, Atlanta, GA (US)

( * ) Notice: Subject to any disclaimer, the term of this patent is extended or adjusted under 35 U.S.C. 154(b) by 1071 days.

(21) Appl. No.: 11/548,970

(22) Filed: Oct. 12, 2006

(51) Int. Cl.
*H04M 1/00* (2006.01)
*G06F 3/00* (2006.01)
*H04N 7/173* (2006.01)

(52) U.S. Cl.
USPC .................. 455/566; 725/61; 725/86; 725/87

(58) Field of Classification Search
USPC ........................................................ 455/558
See application file for complete search history.

(56) References Cited

U.S. PATENT DOCUMENTS

| | | | | |
|---|---|---|---|---|
| 6,918,091 | B2 * | 7/2005 | Leavitt et al. | 715/765 |
| 2003/0211856 | A1 * | 11/2003 | Zilliacus | 455/466 |
| 2005/0164738 | A1 * | 7/2005 | Liu | 455/558 |
| 2006/0019618 | A1 * | 1/2006 | Seppala | 455/121 |
| 2006/0085763 | A1 * | 4/2006 | Leavitt et al. | 715/810 |
| 2006/0184977 | A1 * | 8/2006 | Mueller et al. | 725/86 |
| 2006/0184989 | A1 * | 8/2006 | Slothouber | 725/110 |
| 2006/0258380 | A1 * | 11/2006 | Liebowitz et al. | 455/466 |
| 2006/0258399 | A1 | 11/2006 | Liebowitz et al. | |
| 2007/0101352 | A1 | 5/2007 | Rabina et al. | |

OTHER PUBLICATIONS textually.org. Feb. 2005.*
http://www.textually.org/textually/archives/cat_sms_and_television.htm?p=2, Feb. 18, 2005.*
Nonfinal Office Action dated Mar. 13, 2009 and cited in U.S. Appl. No. 11/555,648.

* cited by examiner

*Primary Examiner* — Charles Appiah
*Assistant Examiner* — Natasha Cosme
(74) *Attorney, Agent, or Firm* — Parks IP Law LLC; Jennifer P. Medlin Esq.

(57) ABSTRACT

A system and method is described for providing a dynamic interactive skin to at least one communications device. The dynamic interactive skin can be used to select one or more items. The items may be selected to send a message to at least one contact, send a vote for at least one contestant in a media program, send a vote for at least one ending of a media program, purchase an item in a store, preorder a product such as a meal or preorder a service such as a movie ticket, and perform various other wireless commerce functions.

22 Claims, 14 Drawing Sheets

DYNAMIC INTERACTIVE SKIN

TECHNICAL FIELD

The present invention relates generally to telecommunications systems and, more particularly, to wireless messaging.

BACKGROUND OF THE INVENTION

Reality television, in one form or another, has been a part of television lineups for many years. In recent years, however, the popularity of such programming has given rise to several sub-genres of reality television. Most notably are those in which television viewers can vote to determine the outcome of a show. These new-generation game shows provide an interactive experience for the audience that was previously unknown. The voting systems typically used for these shows are not without fault.

Many of the voting systems used for these shows are configured to accept votes via a telephone call and/or a Short Messaging Service (SMS) message. In the case of a telephone call, a user dials a telephone number that is assigned to a specific contestant. Likewise, for an SMS message, a user enters a predetermined character string and sends it to a specified number. In either case, the probability of voter error is quite high due in part to the small keypads on many mobile devices.

The demographic of SMS voters is typically younger than that of telephone call voters. This may be due in part to the popularity of SMS messaging among younger generations. If, however, voters were provided a more accessible, fun and easy to use messaging system, then voters may be encouraged to begin using SMS messaging instead of traditional telephony to place their votes. Even with increased SMS voting, voter error can be drastically decreased by providing an easier, more intuitive messaging system.

Thus, it is desirable for the wireless service provider to offer an easily accessible and fun to use messaging system in order to keep veteran voters to continue using the system and also to attract new voters.

Today's consumers are increasingly busy and typically desire the most quick and efficient methods for procuring groceries, take-out food orders, sporting event tickets, movie tickets, concert tickets, and other consumer goods and services. These consumers are likely to embrace technology that increases their efficiency when time is a concern.

Thus, it is also desirable to offer a dynamic interface for a user to select and/or purchase a plurality of goods and services from a number of different establishment types via their communications device.

Children and some disabled individuals may have difficulty using a contact list to find and place a call to a contact or to send a SMS message, MMS message, or other message. Thus, it is also desirable to offer a dynamic interface that provides an easy-to-use interface that is suitable for children and those individuals with special needs.

SUMMARY OF THE INVENTION

Devices, systems, and methods are provided herein that address the needs described above. One such device is a communications device for use with a dynamic interactive skin. The communications device includes a transceiver, a display, a processor, and a memory. The communications device is configured to acquire and store a dynamic interactive skin, the dynamic interactive skin being capable of acquiring content corresponding to a number of items via any means for communication. The communications device can be further configured to display the items on the display, the items being selectable via any means for selection. The communications device can be still further configured to receive a selection of at least one of the items to provide a function to a user of the communications device.

In one embodiment, the content acquired via the dynamic interactive skin includes contact data acquired from the memory such as a telephone number, a text description, an image, a sound, and/or a video.

In some embodiments, the communications device is configured to present the user with a messaging application corresponding to the selected item(s). The messaging application can include the functionality of at least one of Instant Messaging (IM), Short Messaging Services (SMS), Enhanced Messaging Services (EMS), or Multimedia Messaging Services (MMS).

In other embodiments, the content acquired via the dynamic interactive skin includes media program data corresponding to a transmitted media program viewable by a user, the dynamic interactive skin being operational to provide the user with a voting capability corresponding to a plurality of contestants or a plurality of endings of the transmitted media program. The media program data includes a number address and at least one of a text description, an image, a sound, and/or a video.

In further embodiments, the communications device is configured to send a predetermined message to the number address of one or more of the selected items, the predetermined message establishing at least one vote for the selected item. Alternatively, the communications device can be configured to send the predetermined message to a network node, the network node being configured to accept votes from the communications device.

A system for use with a dynamic interactive skin is also provided. The system includes at least one communications device configured to acquire and store a dynamic interactive skin, the dynamic interactive skin being capable of acquiring content corresponding to a number of items via any means for communication. The communications device or devices are further configured to display the items on a display of the communications device, the items being selectable via any means for selection. The communications device or devices are still further configured to receive a selection of at least one of the items to provide a function to a user of the communications device.

In some embodiments, the above-described content includes contact data such as a telephone number, a text description, an image, a sound, and a video. The contact data being acquired from a memory of the communications device.

In further embodiments, the user is presented with a messaging application corresponding to the selected item. The messaging application including the functionality of at least one of Instant Messaging (IM), Short Messaging Services (SMS), Enhanced Messaging Services (EMS), and Multimedia Messaging Service (MMS).

In other embodiments, the content includes media program data corresponding to a transmitted media program viewable by a plurality of users and the dynamic interactive skin being operational to provide each user with a voting capability corresponding to a plurality of contestants of the transmitted media program. The media program data includes a number address and at least one of a text description, an image, a sound, and a video. Alternatively, the voting capability corresponds to a plurality of endings of the transmitted media program.

In some embodiments, the communications device is further configured, upon selection of the item(s), to send a predetermined message to the number address, the predetermined message establishing at least one vote for the selected item.

In some embodiments, the system also includes a network node that is configured to accept votes from the at least one communications device via any means for communication. The network node can be further configured to determine at least one winning contestant from the plurality of contestants based upon the number of votes received for each contestant. Alternatively, the network node can be further configured to determine at least one winning ending from the plurality of endings based upon the number of votes received for each contestant.

A method for the acquisition and use of a dynamic interactive skin by a communications device is also provided. In one embodiment, the method includes the step of providing via means for communication a dynamic interactive skin to at least one communications device, the dynamic interactive skin being capable of acquiring content corresponding to a number of items via means for communication. The method further includes the step of configuring the items to be displayed on a display of the communications device, wherein the items are selectable via a menu system. The method still further includes the step of receiving a selection of at least one of the items to provide a function to a user of the communications device.

In some embodiments, the content includes contact data such as a telephone number, a text description, an image, a sound, and a video. The content being acquired from a memory of the communications device.

In further embodiments, the user is presented with a messaging application corresponding to a selection of an item. The messaging application can include the functionality of at least one of IM, SMS, EMS, and MMS.

In alternative embodiments, the content includes media program data corresponding to a transmitted media program that is viewable by a plurality of users and the dynamic interactive skin is operational to provide each user with a voting capability corresponding to a plurality of contestants of the transmitted media program. Alternatively, the voting capability corresponds to a plurality of endings of the transmitted media program. In either embodiment, the media program data can include a number address and at least one of a text description, an image, a sound, and a video.

In some embodiments, the communications device is further configured, upon selection of the item(s), to send a predetermined message to the number address, the predetermined message establishing at least one vote for the selected item.

In some embodiments, the method further includes the step of sending votes to a network node that is configured to accept votes from at least one communications device via any means for communication. The network node can be further configured to determine at least one winning contestant from the plurality of contestants based upon the number of votes received for each contestant. Alternatively, the network node can be further configured to determine at least one winning ending from the plurality of endings based upon the number of votes received for each contestant.

Alternative devices, systems, and methods, for a dynamic interactive skin for use in procuring consumer goods and services from, for example, a store, a restaurant, a movie theatre, a sports venue, and the like are also provided herein.

DETAILED DESCRIPTION OF THE INVENTION

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
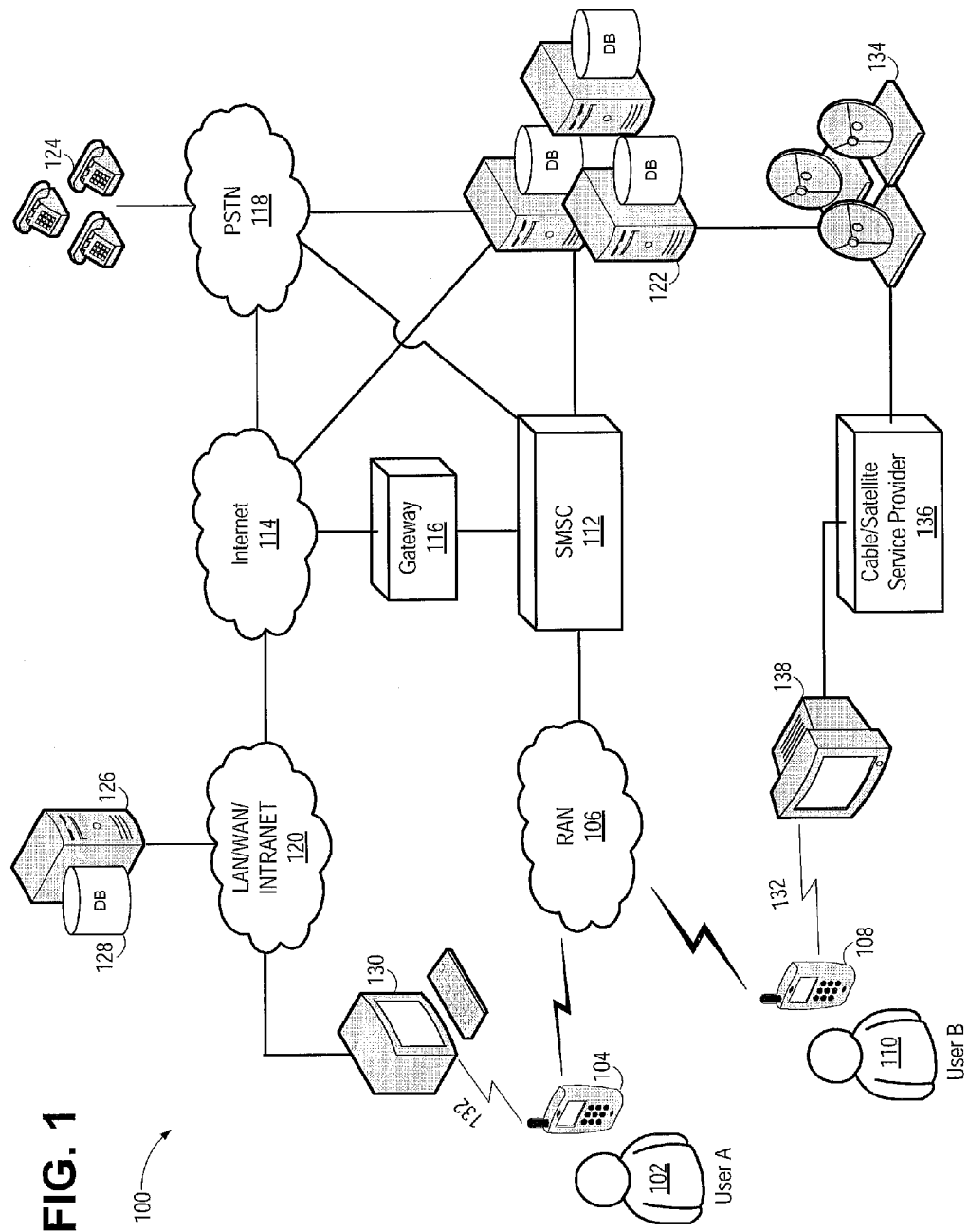
FIG. 1 illustrates a communications system, according to the present invention.

Referring now to the drawings in which like numerals represent like elements throughout the several views, FIG. 1 depicts an exemplary communications system 100, according to the present invention. The illustrated communications system 100 includes a user (User A) 102 and associated mobile device (MD A) 104. MD A 104 is in communication with a Radio Access Network (RAN) 106. The means for wireless communication used by the RAN 106 can include, but is not limited to, Time Division Multiple Access (TDMA), Code Division Multiple Access (CDMA), Global System for Mobile communications (GSM), Enhanced Data rates for Global Evolution (EDGE), General Packet Radio Service (GPRS), WiFi, Universal Mobile Telecommunication System (UMTS)/Wideband Code Division Multiple Access (WCDMA), IP Multimedia Subsystem (IMS), satellite any combination thereof, and the like. Also in communication with the RAN 106 is MD B 108. MD B 108 is associated with User B 110.

A single RAN 106 is illustrated, however, it is contemplated that User A 102 and User B 110 can be in communication, via their respective MDs 104, 108, with RANs operating via different means for wireless communication. The illustrated RAN 106 is in communication with a Short Message Service Center (SMSC) 112. The SMSC 112 is responsible for delivering SMS messages as is known to those skilled in the art. It should be understood that the protocol used by the SMSC 112 and other elements associated with the transmission and reception of Short Messaging Service (SMS) messages can be, for example, Short Message Peer-to-Peer (SMPP), External Machine Interface/Universal Computer Protocol (EMI/UCP), Computer Interface to Message Distribution (CIMD), Open Interface Specification, and/or others known to those skilled in the art.

The SMSC 112 is in communication with an IP network, for example, the Internet 114 through a gateway 116. The Internet 114 in turn is in communication with the Public Switched Telephone Network (PSTN) 118, a Local Area Network (LAN)/Wide Area Network (WAN)/Intranet 120, and a voting system 122.

The LAN/WAN/Intranet 120 can be, for example, a business LAN, such as for a retail store. A server 126 and a kiosk 130 are in communication with the LAN 120. The server 126 can be configured to store a database 128. The database 128 can be any type including, but not limited to, an analytic database, an operational database, a hierarchical database, a network database, or any combination thereof, and the like. The database 128 can be configured to store, for example, applications, vendor information, product information, product inventory, promotional media, and the like. The kiosk 130 can communicate with the server 126 and extract this data from the database 128. Alternatively, the kiosk 130 can include a local storage that can store the data and may also periodically communicate with the server 126 to synchronize the data and obtain any updated data. The server 126 and the kiosk 130 may also acquire updated data via the Internet 114. The data can then be sent to one or more mobile devices such as MD A 104, which as illustrated is in communication with the kiosk 130 via means for communication 132. Means for communication 132 can include, but is not limited to, infrared (IR), infrared data association (IrDA), Bluetooth, WiFi, direct connection (e.g., Universal Serial Bus (USB), FireWire IEEE 1394, serial), Ethernet, any combination thereof, and the like.

In one embodiment, user A 102 may enter a retail store. The retail store may have a kiosk such as kiosk 130. User A 102 could establish communication with the kiosk 130 to acquire an interactive skin through any means for communication 132. The interactive skin can be used to, for example, acquire store inventory, create shopping lists, preorder items, and otherwise provide interaction between the user and the store.

The interactive skin can be dynamic in that updates may upgrade or downgrade the functionality of the skin. These updates may be acquired via the kiosk 130 or via a number of other methods described herein.

It should be understood that the term skin is used herein to broadly encompass any application that is functional to change the appearance of a second application and optionally add additional functionality to the second application. It is contemplated, however, that the skin may be a stand-alone application that does not utilize the resources of another application to provide its basic functionality.

The illustrated voting system 122 includes a plurality of servers and databases configured to receive votes. In one embodiment, the votes are used to determine which of a number of contestants are to be voted off of a television game show and eventually to determine the winner of the contest. In a similar embodiment, the votes may be used to determine a winner of a radio contest. In another embodiment, the votes are used to determine which of a number of endings is to be used for a broadcast such as, but not limited to, a television series, a movie, a sporting event, a news show, an interactive virtual reality game, and the like.

The voting system 122 is in communication with the SMSC 112 by which SMS message votes can be received, with the PSTN 118 by which telephone votes can be received, and with the Internet 114 by which Internet-based votes can be received. It should be understood that the PSTN 118 may also include the Public Land Mobile Network (PLMN). The RAN 106 and the PSTN/PLMN 118 are shown as separate elements. It is contemplated, however, that the PSTN/PLMN 118 can include the RAN 106 and as such telephone votes from mobile devices (such as MD A 104 and MD B 108) and from landline telephones, such as telephones 124, can be sent to the voting system 122 via the PSTN/PLMN 118. Regardless of the origin of the votes, the voting system 122 can utilize any algorithm known to those skilled in the art to count the votes and determine the winning contestant(s) or ending.

The voting system 122 is also in communication with a television network 134, which in turn is in communication with a cable/satellite provider 136. The cable/satellite provider 136 can be in communication with a plurality of homes, which may contain at least one television 138. The voting system 122 can send the results to the television network 134, which may present the results in, for example, a results show that is broadcast over air directly to television 138 or to the cable/satellite service provider 136 and subsequently to the television 138. It is contemplated that voting results can be sent via at least one SMS message to MDs 104 and 108. It is further contemplated that voting results can be accessible via the Internet 114 and the PSTN 118.

An interactive voting skin may be acquired through television 138 via any means for communication 132 or alternatively through a set-top box (not shown) operatively linked to the television 138. The television 138 and/or the set-top box can receive a base interactive voting skin and updates for the base interactive voting skin via subsequent download sessions via a link to, for example, the Internet 114. In one embodiment, a user may be watching a television game show on television 138 and at some point the game show may instruct the user to download the interactive voting skin to their mobile device. This may be for users that currently do not have the interactive skin loaded on their device. The interactive skin can be pre-loaded with the available contestants and their respective voter information, for example, character string and number for sending a text message or may be a default skin that is updated each week to reflect the remaining contestants. If the user's mobile device already has the interactive voting skin from a previous week's show, then the user may acquire an update for the present week and, if available, a number of future weeks. Alternatively or in addition, a user can send an SMS message to opt in to receive the interactive skin and/or updates. The interactive skin and/or updates can then be sent to the user's mobile device over the air.

Alternative methods may include downloading an interactive messaging skin or an update to the interactive messaging skin via a kiosk, such as kiosk 130. The kiosk 130 may be configured with an advertisement, an interactive messaging skin, an update for the interactive messaging skin, and additional information and/or media that may not be available from another source. Further alternative methods for acquiring the interactive voting skin and messages may be utilized and are contemplated.

Figure 2:
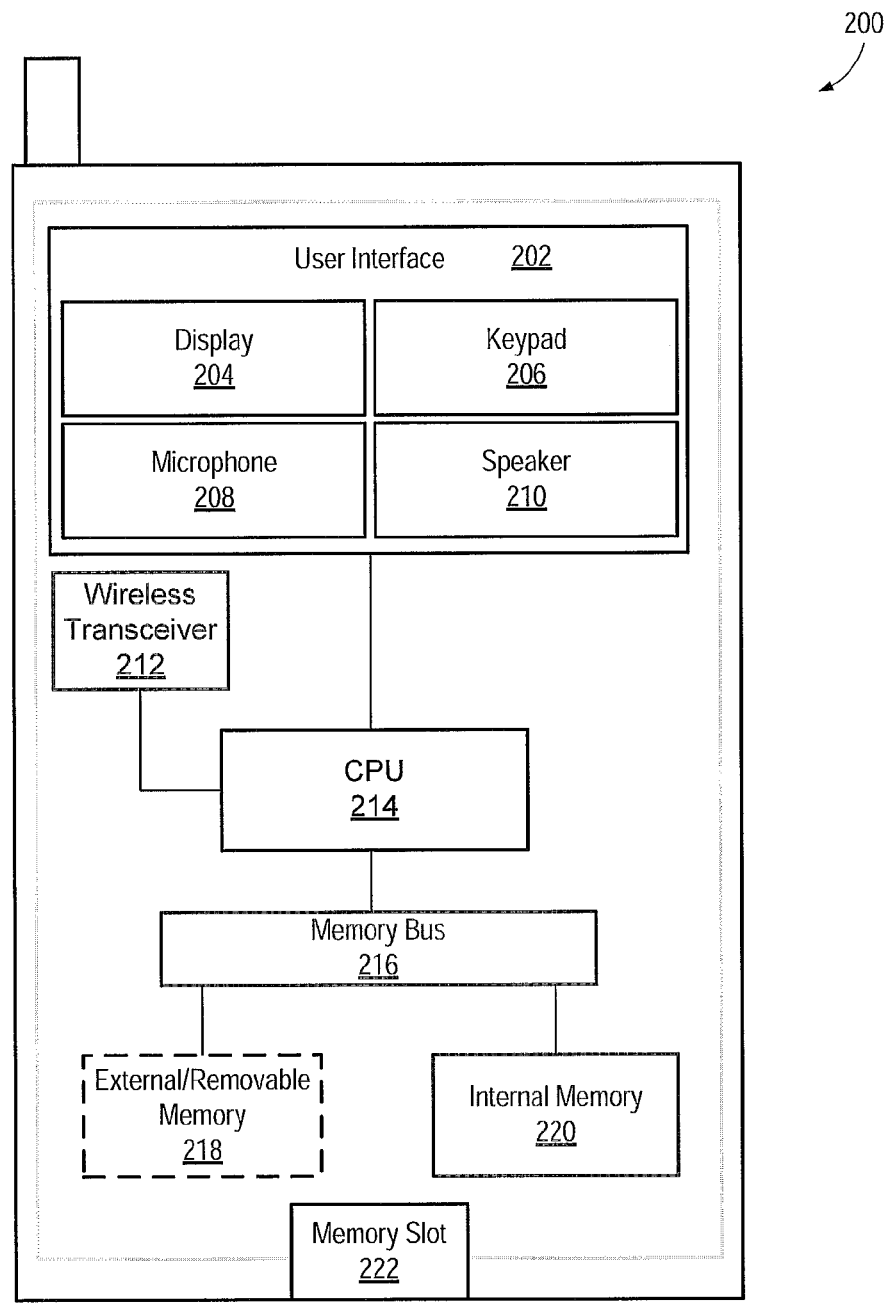
FIG. 2 illustrates the components of an exemplary mobile device, according to the present invention.

Referring now to FIG. 2, an exemplary MD 200 and its components are shown. The illustrated MD 200 includes a user interface 202 operatively linked to a central processing unit (CPU) 214, which in turn is operatively linked to a wireless transceiver 212 and a memory bus 216. The memory bus 216 is operatively linked to both an external/removable memory 218 and an internal device readable memory 220. The MD 200 is also configured with a memory slot 222 so that external/removable memory 218 may be removably inserted into MD 200.

The illustrated user interface 202 includes a display 204, a keypad 206, a microphone 208, and a speaker 210. The display 204 can be any type such as, but not limited to, liquid crystal display (LCD), light emitting diode (LED), thin-film transistor (TFT), and the like. The keypad 206 can comprise any number of keys and the keys can be constructed from any type of material and can be any shape, size, color, and texture. The microphone 208 and the speaker 210 can be any type known to those skilled in the art.

The CPU 214 and memory bus 216 should be sufficient to handle the additional processing and memory storage duties associated with implementing the present invention. The CPU 214 and memory bus 216 architectures can be any type known to those skilled in the art, and the corresponding memory types used by the internal memory 220 and the external/removable memory 218 can be, for example, a read-only memory (ROM), a random access memory (RAM), and/or a hybrid of ROM and RAM.

Figure 3:
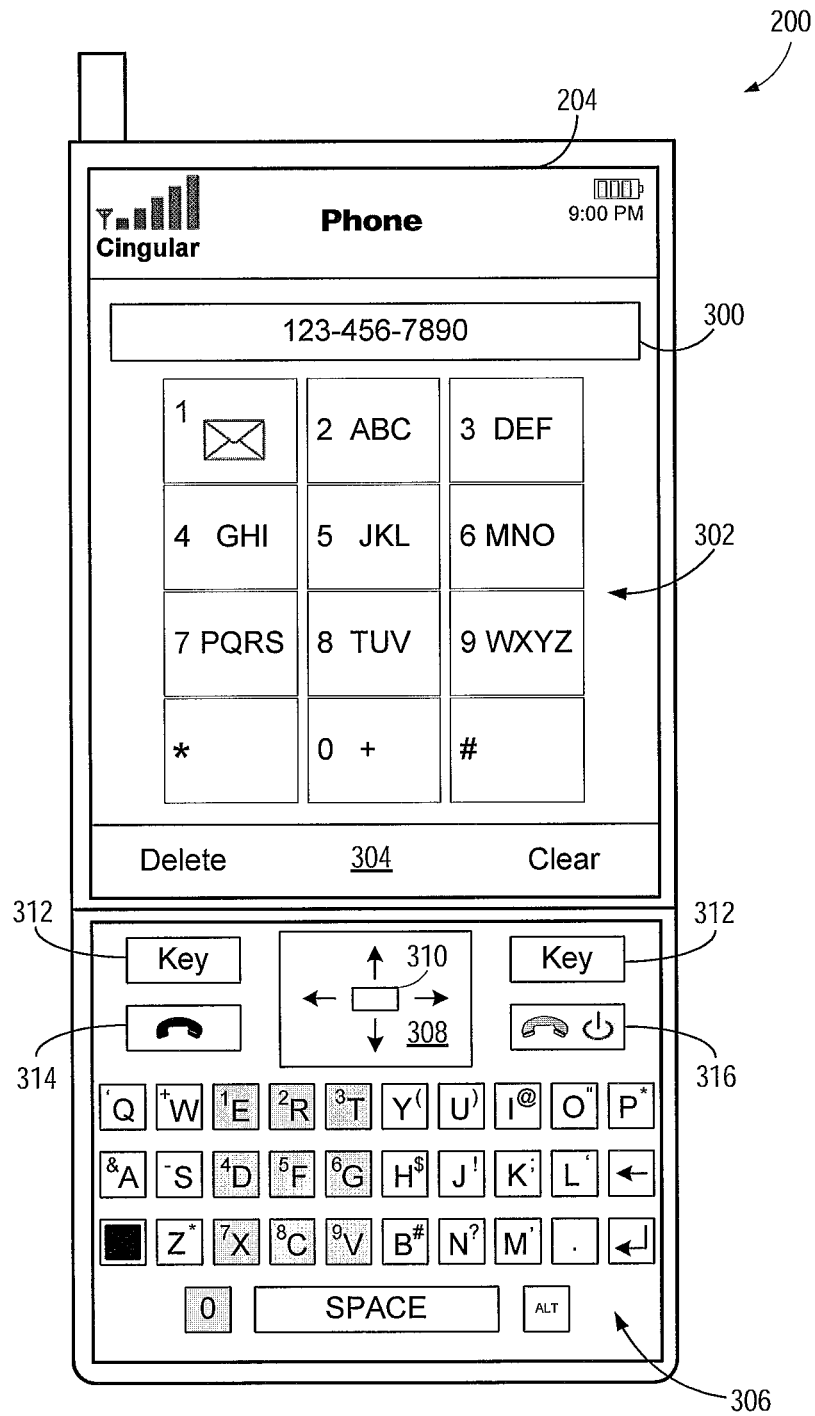
FIG. 3 illustrates a mobile device that includes a display on which a digital keypad is shown.

Referring now to FIG. 3, the exterior of MD 200 is shown. The illustrated MD 200 includes a display 204. As illustrated, the display 204 includes a number entry field 300, a digital keypad 302, and a soft key menu 304. The number entry field 300 is configured to accept a number string. The illustrated digital keypad 302 includes twelve keys, each of which are assigned to function like those of a typical telephone keypad. The digital keypad 302 keys can be selected via any means for selection including, but not limited to, tactile selection, voice recognition, a scroll wheel, a directional pad (e.g., directional pad 308), a corresponding hard key (e.g., hard keys 312), any combination thereof, and the like. The illustrated soft key menu 304 includes a Delete soft key and a Clear soft key. The Delete soft key and the Clear soft key are operational to singly delete numbers from the number entry field 300 and to clear all number from the number entry field 300, respectively. It is contemplated that the soft keys displayed in the soft key menu 304 can be any and can perform any corresponding function. Further, the soft keys may change corresponding to the information displayed on display 204, as will be seen in subsequent figures.

The illustrated mobile device 200 further includes various hard keys. A hard keypad 306 includes letters arranged in a typical QWERTY layout. Alternate characters, such as numbers and punctuation can be accessed through the ALT key. Hard keys 312 correspond to the soft keys shown in soft key menu 304. An initiate call hard key 314 and an end call/power key 316 are shown on either side of a directional pad 308.

The directional pad 308 can provide access to selectable items displayed on display 204 through each of four main directions: up, down, left, and right. Intermediate directions between the main directions can provide further access. The directional pad can be used to highlight and select an item. More specifically, the directional pad 308 can be used to highlight a digital key and directional pad center key 310 can be used to select the digital key. Alternatively, the directional pad 308 can be used to toggle between selectable items assigned to each of the four main directions and a number of intermediate directions. If the directional pad 308 is pressed in the up direction, for example, then the selectable item displayed in a direction up from a predetermined center (origin) would be selected. Likewise, selectable items are assigned to the down, left, and right directions.

Figure 4:
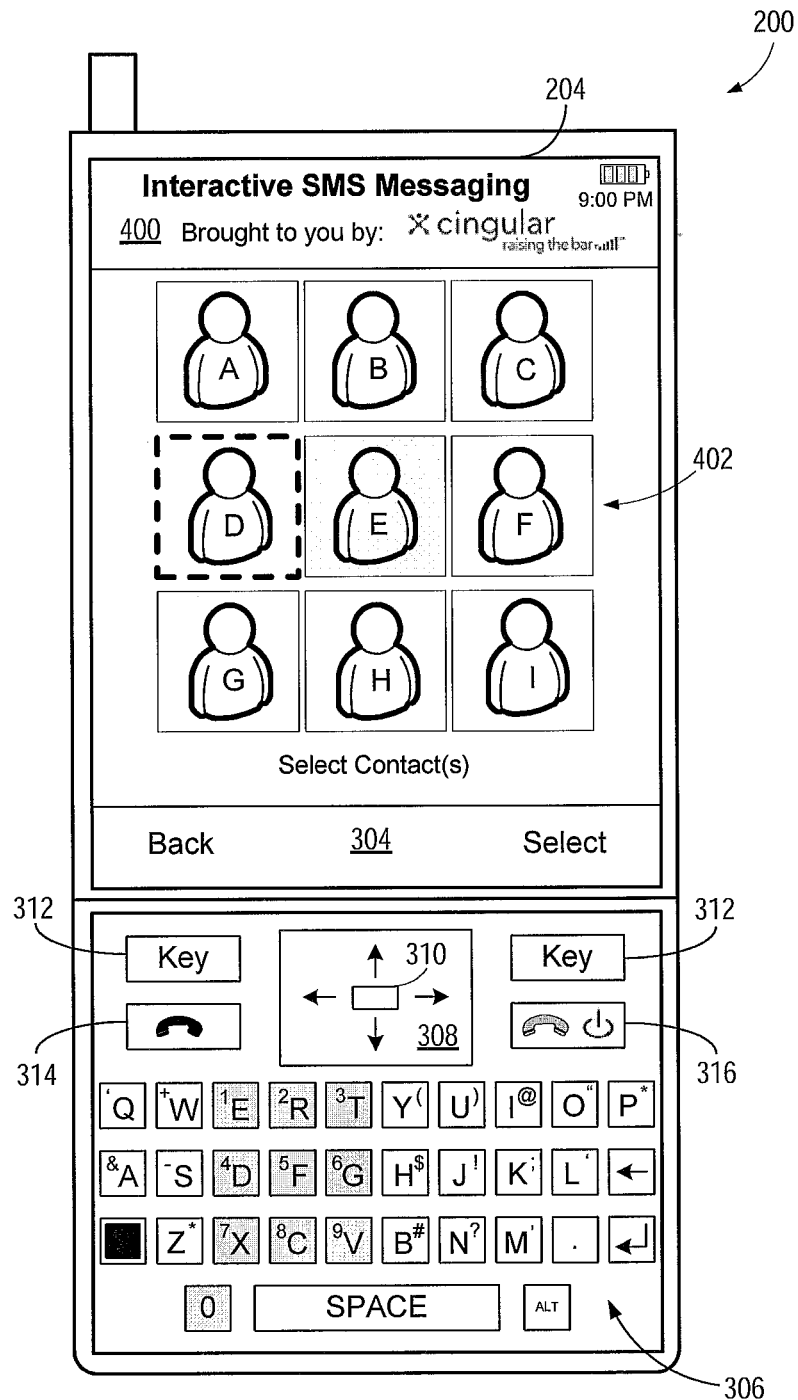
FIG. 4 illustrates a mobile device that includes a display on which a contact selection screen is shown, according to the present invention.

Referring now to FIG. 4, an interactive messaging skin 400 is depicted on display 204 of mobile device 200, according to the present invention. In the present embodiment, the interactive messaging skin 400 is used for SMS messaging and is further described in this context with reference to FIGS. 5-8. Other messaging types, for example Multimedia Message System (MMS) messaging, are also contemplated.

The illustrated interactive messaging skin 400 includes a contact selection screen 402 in which visual representations of nine contacts are displayed. Each of the nine contacts is mapped to a contact in a user's contact list. When the interactive messaging skin is loaded, the image associated with that contact is loaded into one of the nine positions. The loaded contacts can be based upon a default setting, for example, that assigns the nine most often used contacts to these positions. Alternatively or in addition, this setting or may be customized to accommodate to a user's preferences.

The contact selection screen 402 does not have to be limited to nine contacts. Instead, the contact selection screen 402 can include any number of contacts and they can be displayed in any layout. The contacts can also be presented in any style. For cases in which the number of contacts loaded exceeds the viewable measurements of the display 204, a horizontal and/or vertical scroll feature can be implemented to allow access to these contacts. This scroll feature can be made operable by a scroll wheel (not shown) or a key on MD 200.

Figure 5:
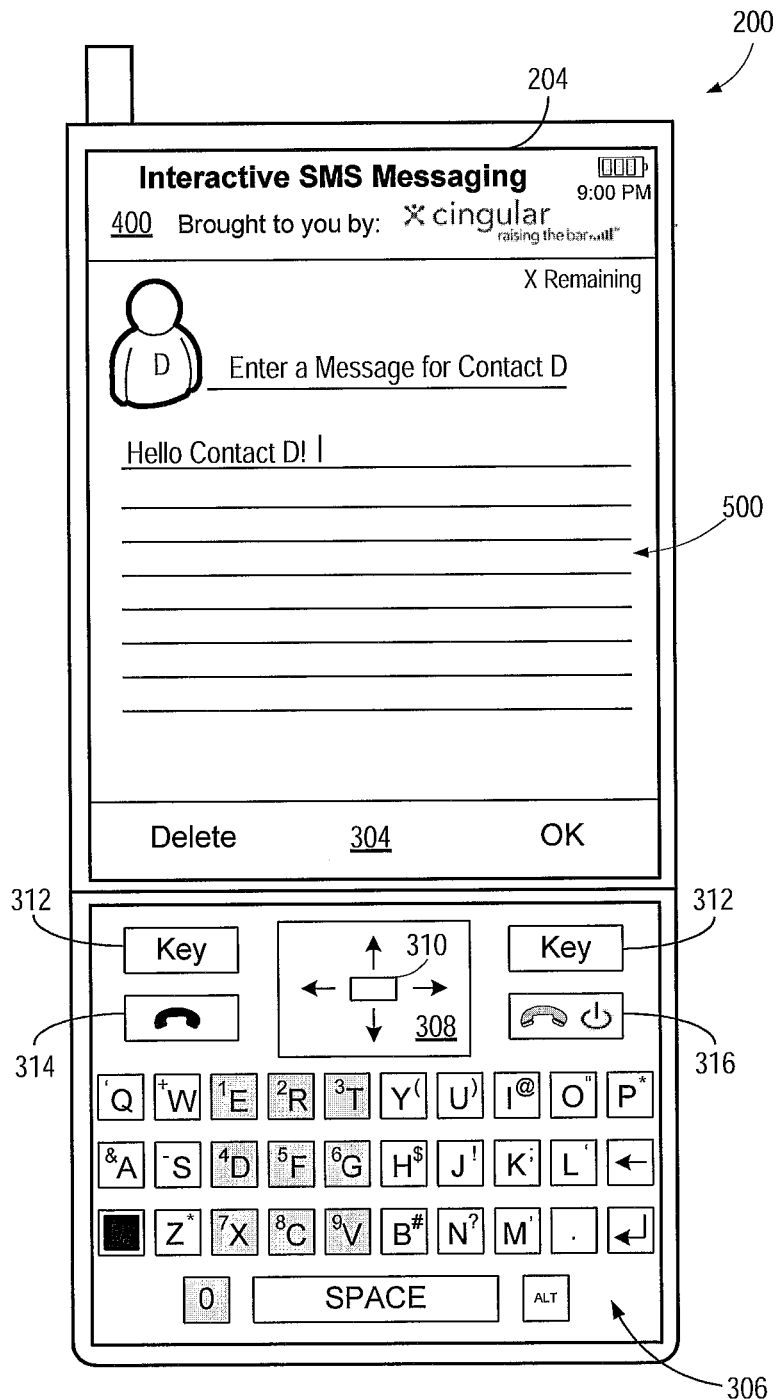
FIG. 5 illustrates a mobile device that includes a display on which a message prompt is shown, according to the present invention.

A user can select, via any means for selection, one or more contacts from the contact screen 402. After the contact(s) is selected, a message prompt 500 is displayed, as shown in FIG. 5. The message prompt 500 can include all the elements of a traditional SMS message prompt. The user can enter a message and, in the case of an MMS message, optionally attach images, sounds, videos, or other media. The user can then accept the message by pressing the hard key 312 that now corresponds to an OK soft key. The user may also accept the message by other means for selection. In alternative embodiments, a menu of pre-selected messages can be presented to the user. The user can select a message and accept the selected message.

Figure 6:
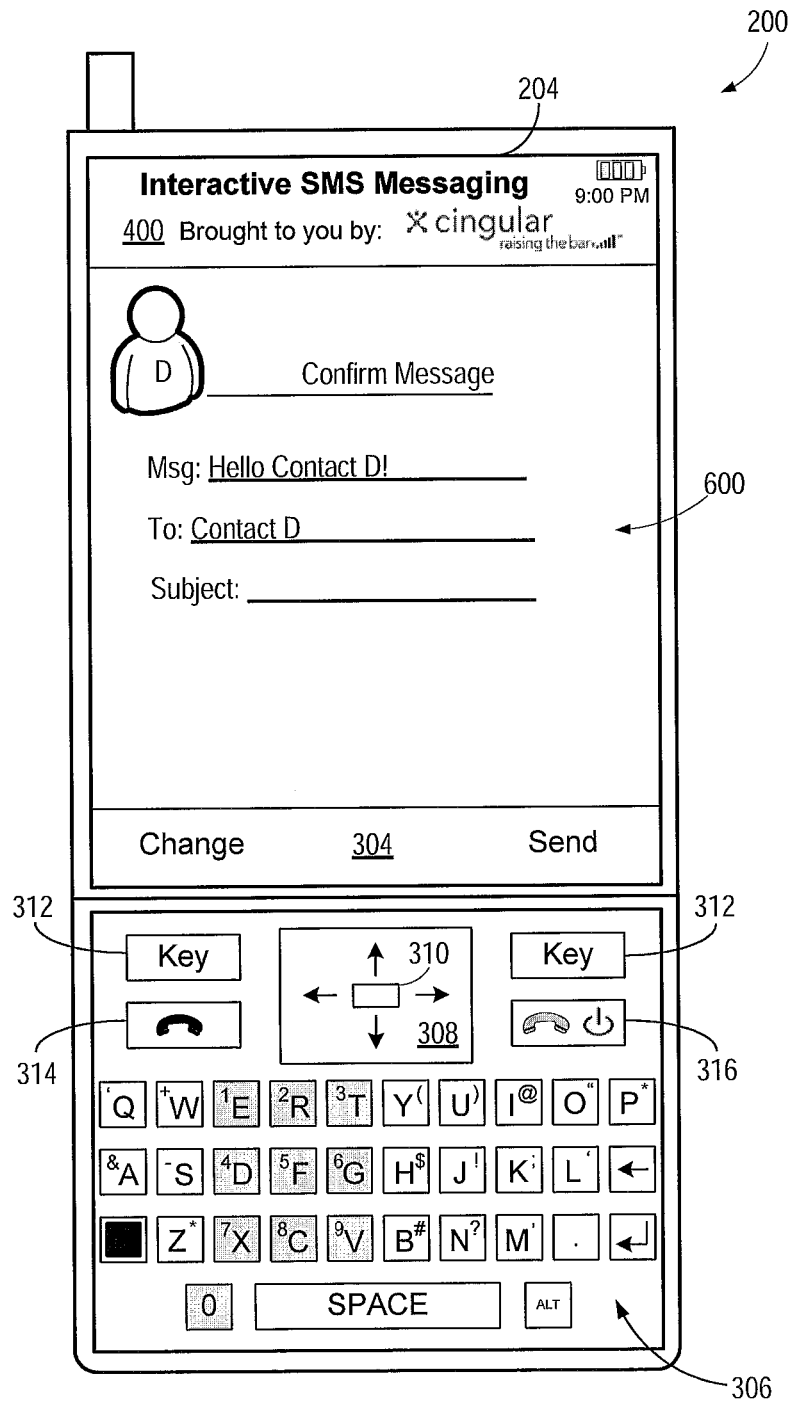
FIG. 6 illustrates a mobile device that includes a display on which a confirmation screen is shown, according to the present invention.
Figure 7:
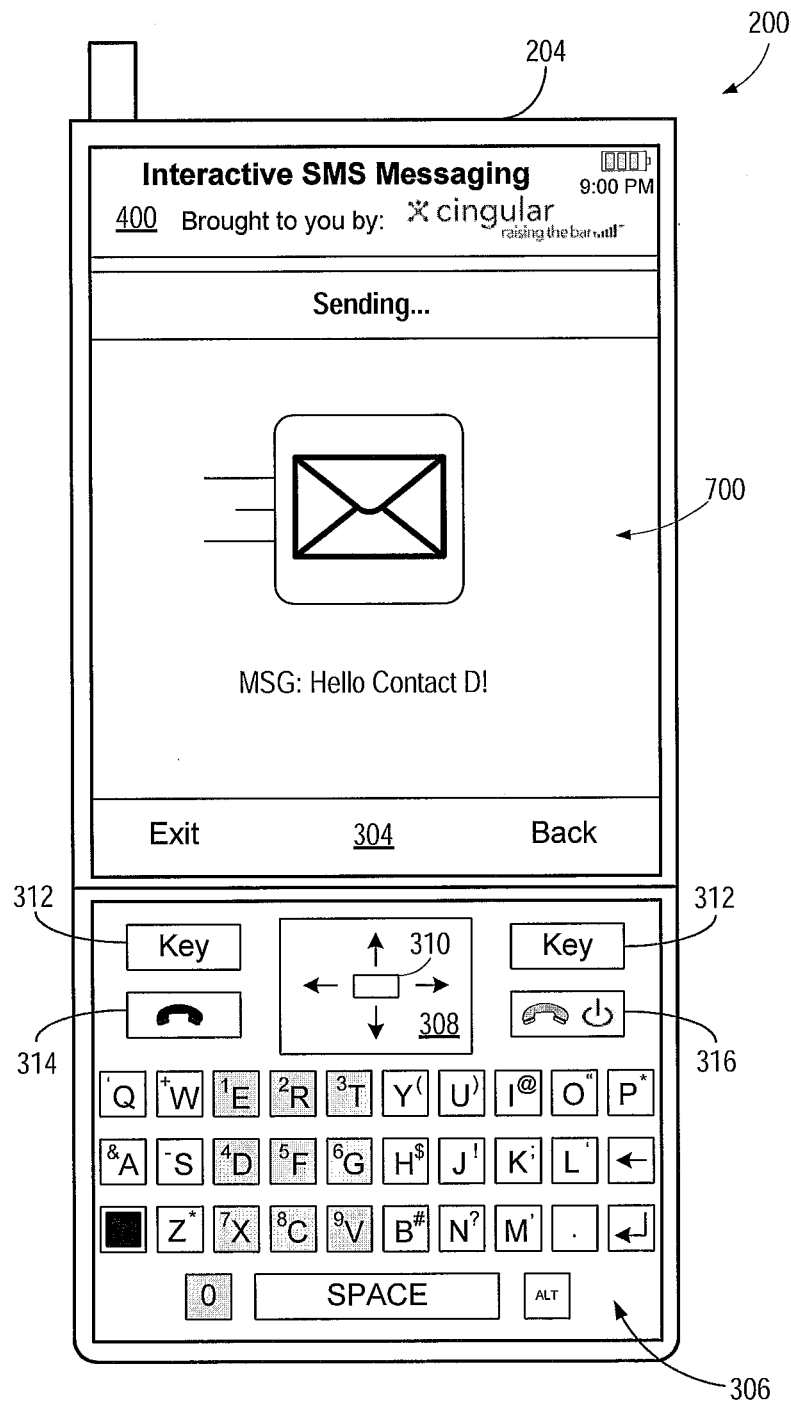
FIG. 7 illustrates a mobile device that includes a display on which a notification is displayed, according to the present invention.

After the user enters a message, optionally attaches any images, sounds, videos, and/or other media, and accepts the message, the user can be presented with a confirmation screen 600, as shown in FIG. 6. The confirmation screen 600 can include the message text, the selected recipient(s), the subject, and attached media, if any. After the user accepts the confirmation, the message is sent. As shown in FIG. 7, a notification 700 may be presented to the user. The notification may inform the user that the message is being sent and/or that the message was sent.

Figure 8:
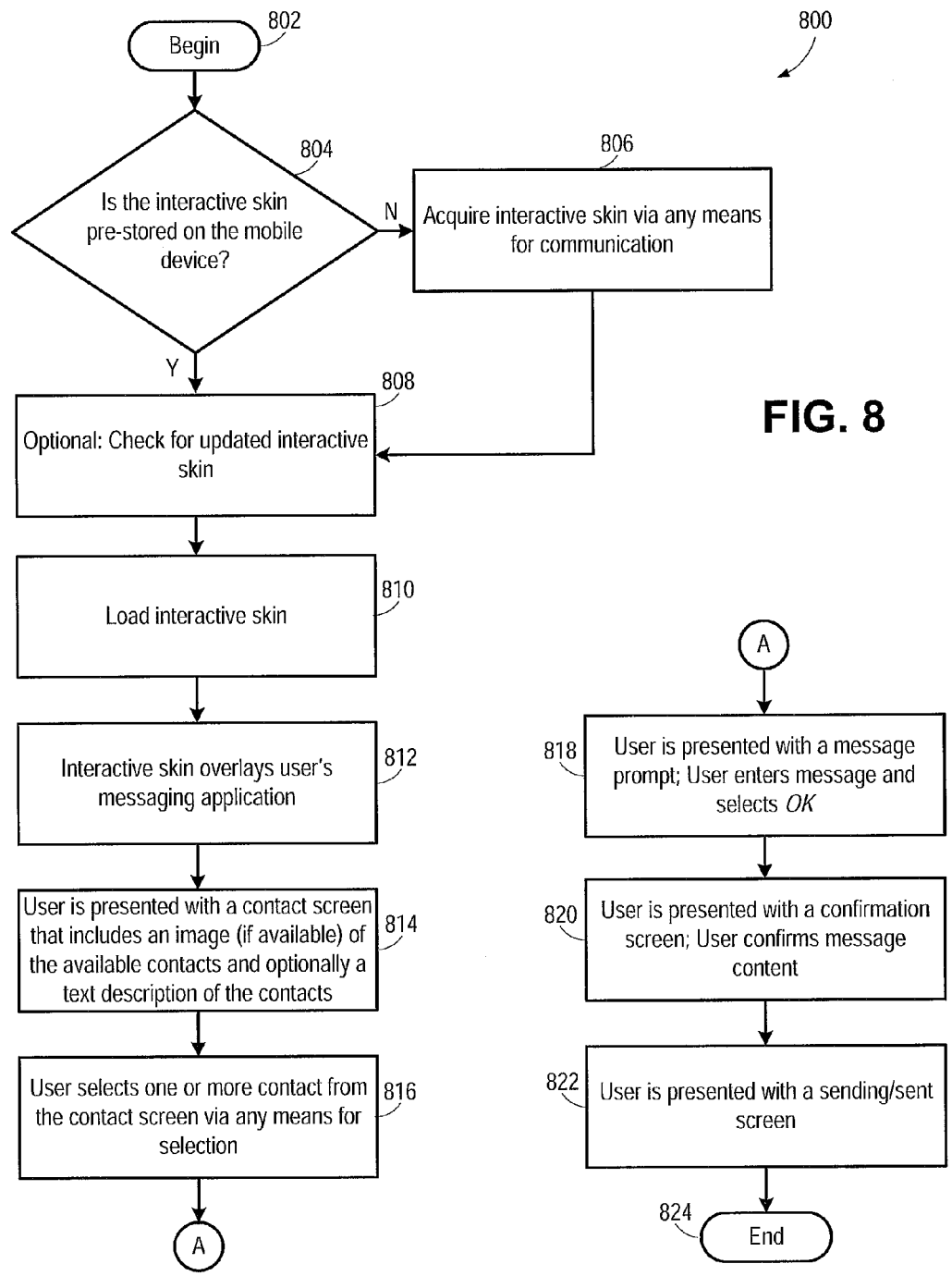
FIG. 8 illustrates an exemplary method for sending a message utilizing an interactive messaging skin, according to the present invention.

Referring now to FIG. 8, an exemplary method 800 for sending a message utilizing the interactive messaging skin 400 is shown. It should be understood that the steps described herein with reference to FIG. 8 are not limited to the order shown.

The exemplary method 800 begins at step 802 and proceeds to step 804, wherein it is determined if the interactive messaging skin 400 is pre-stored in a memory of MD 200, for example, in external/removable memory 218 and/or internal memory 220. The interactive messaging skin 400 may have been pre-loaded onto the mobile device by the manufacturer or may have been acquired by the user at an earlier date.

If the interactive messaging skin 400 is not pre-stored on the MD, the interactive messaging skin 400 can be acquired through any means for communication 132 at step 806. To reiterate, means for communication 132 can include, but is not limited to, infrared (IR), infrared data association (IrDA), Bluetooth, WiFi, other wireless connectivity, direct connection (e.g., Universal Serial Bus (USB), FireWire IEEE 1394, serial), any combination thereof, and the like.

After the interactive messaging skin 400 is acquired, the interactive messaging skin 400 can be stored in the memory 218, 220. The method 800 then proceeds to optional step 808, wherein a check is performed to determine if the interactive messaging skin 400 received through means for communication 132 was in fact the latest version available. If not, the interactive messaging skin 400 is updated.

If, at step 804, it is determined that the interactive messaging skin 400 is pre-stored, then the method 800 proceeds to optional step 808 wherein a check is performed to determine if the MD 200 has the latest version of the interactive messaging skin 400.

After the interactive messaging skin 400 is acquired and/or updated, the method 800 then proceeds to step 810 wherein the interactive messaging skin 400 is loaded. It should be understood that the term load, as used herein, is meant to broadly encompass any act of extracting data from one memory and storing the data in another memory for at least temporary use of the data for performing one or more operations.

Upon first load of the interactive messaging skin 400, a setup menu (not shown) may be displayed. The setup menu may be configured to accept a user's input with regard to a number of user preferences. The setup menu may also be accessible by the user on subsequent uses of the interactive messaging skin 400.

After the interactive messaging skin 400 is loaded in step 810, the method 800 proceeds to step 812 wherein the interactive messaging skin 400 can utilize various settings to determine which contacts are to be displayed on a contact selection screen 402. Images and text descriptions of each contact can also be obtained during this step from, for example, the user's contact list.

At step 814, the user is presented with the contact selection screen 402. At step 816, the user selects one or more contacts from the contact selection screen 402 via any means for selection. Upon selection, the user is presented with a message prompt 500 at step 818. The user enters a message and selects the OK soft key or the functional equivalent thereof via any means for selection, which presents the user with a confirmation screen 600 at step 820. The user confirms the message content and the message is sent. The user may receive a notification 700 that the message is being sent or that the message was sent, at step 822. The exemplary method 800 ends at step 824.

The messaging embodiment described with reference to FIGS. 4-8 provided an interactive messaging skin 400 that allowed a user to select one or more contacts based upon an image and an optional text description of the contact(s). The following discussion describes an embodiment of the present invention wherein the messaging embodiment is extended for use in voting applications such as those for reality television shows, and other game shows.

Figure 9:
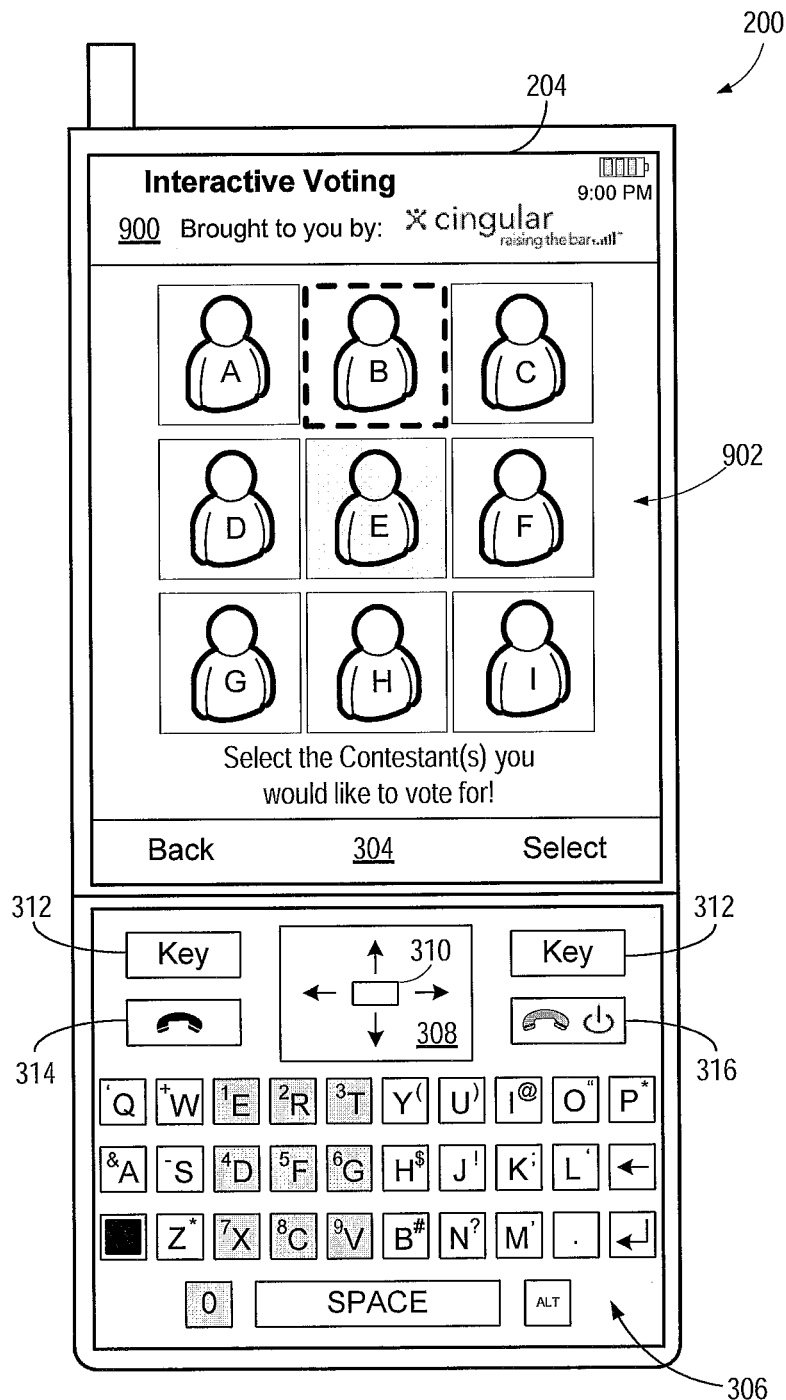
FIG. 9 illustrates a mobile device that includes a display on which a contestant selection screen is shown, according to the present invention.

Referring now to FIG. 9, an interactive voting skin 900 is depicted on display 204 of the mobile device 200, according to the present invention. The illustrated interactive voting skin 900 includes a contestant selection screen 902 in which visual representations of nine contestants are displayed. Each of the nine contestants is mapped to a contestant of, for example, a television game show. Each contestant can be assigned a specific character string that is used for the message body of an SMS message, for example. A destination number can also be assigned. The pre-determined character string and destination numbers can be assigned by the voting system 122, the television network 134, or another entity. These assignments can be integral to the interactive voting skin 900 and can be updated periodically, for example, after one or more contestants are voted off to reflect the new contestants. This establishes the voting procedure as a one step selection process, wherein the message body and destination are already pre-determined so as to reduce and possibly eliminate the likelihood of voter error.

The contestant selection screen 902 does not have to be limited to nine contacts. Instead, the contestant selection screen 902 can include any number of contacts and they can be displayed in any layout. The contestants can also be presented in any style. For cases in which the number of contestants loaded exceeds the viewable measurements of the display 204, a horizontal and/or vertical scroll feature can be implemented to allow access to these contacts. This scroll feature can be made operable by a scroll wheel (not shown) or a key on MD 200.

Figure 10:
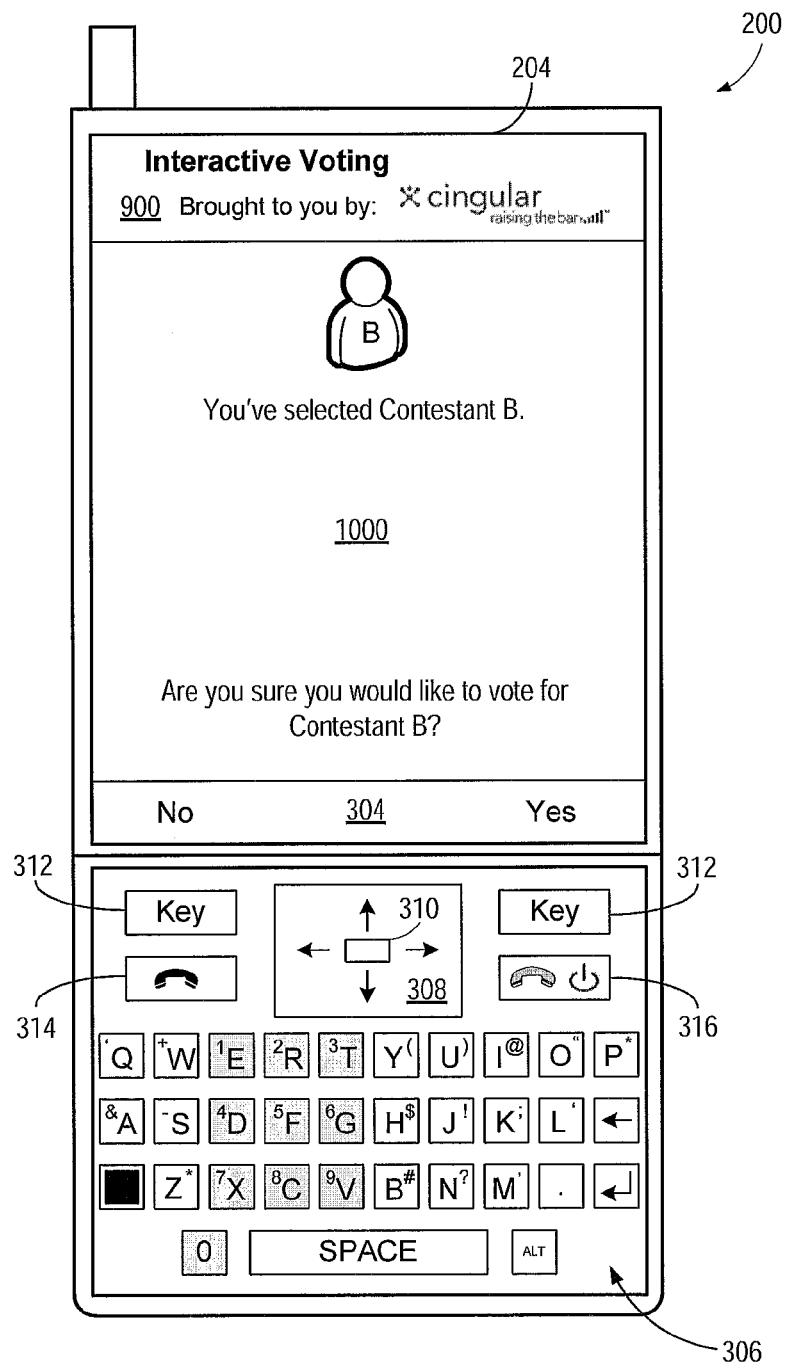
FIG. 10 illustrates a mobile device that includes a display on which a confirmation screen is shown, according to the present invention.
Figure 11:
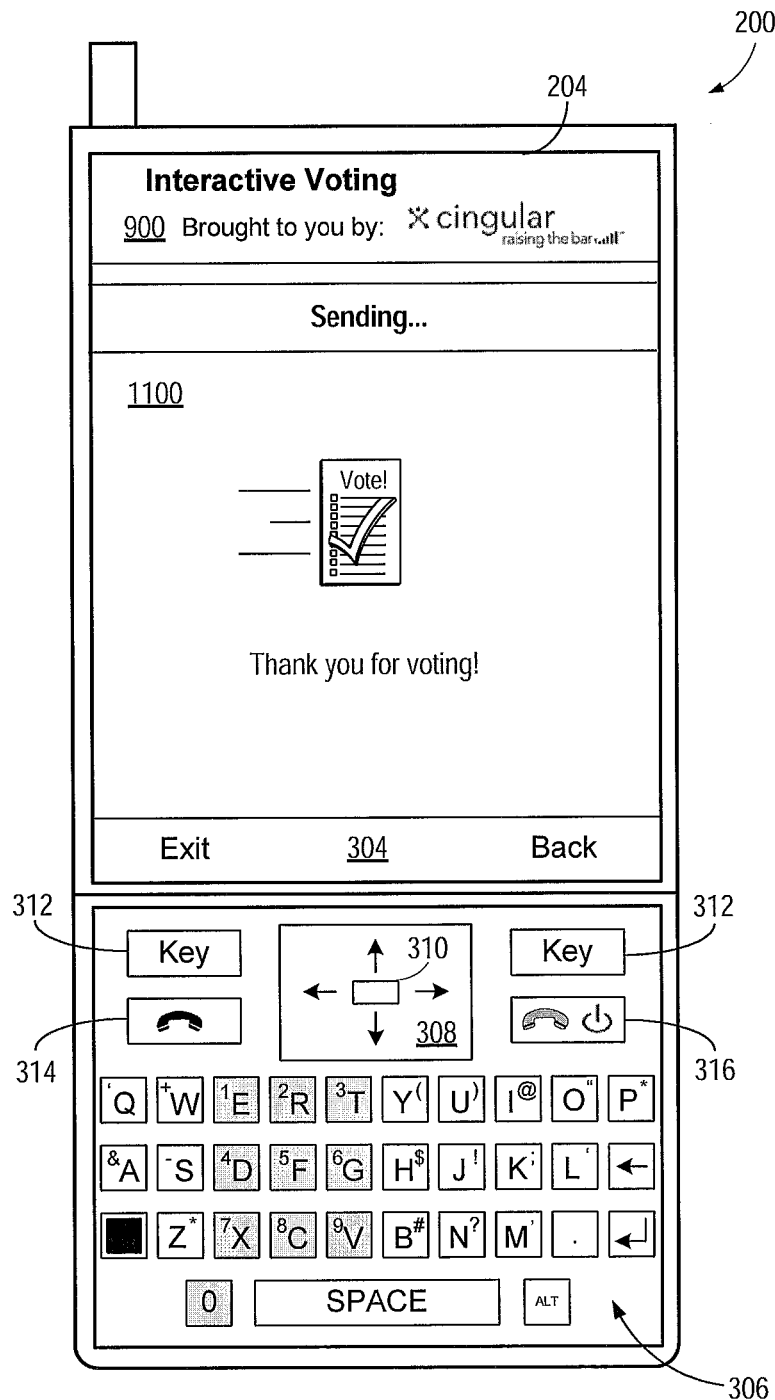
FIG. 11 illustrates a mobile device that includes a display on which a vote notification is shown, according to the present invention.

The user can select, via any means for selection, one or more contestants from the contestant screen 902. After the contact(s) is selected, the user can be presented with a confirmation screen 1000, as shown in FIG. 10. The confirmation screen 1000 can include the selected contestant(s) and can provide soft keys to confirm or not confirm the user's selection. After the user confirms the vote, the user can be presented with a notification 1100, as shown in FIG. 11. The notification 1100 may inform the user that the vote is being sent and/or that the vote was sent.

Figure 12:
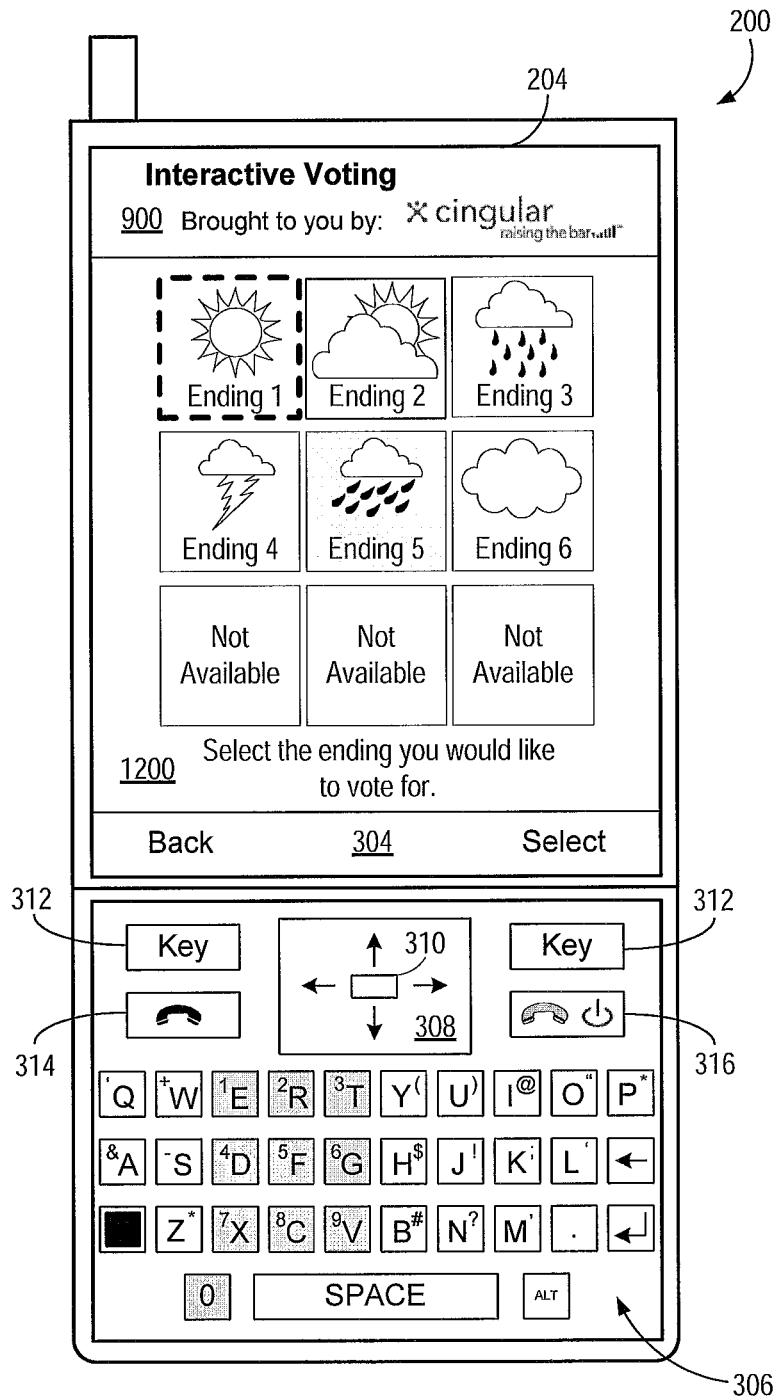
FIG. 12 illustrates a mobile device that includes a display on which an ending selection screen is shown, according to the present invention.

Referring now to FIG. 12, the interactive voting skin 900 may also be used for selecting an ending to a television show, a movie, or other media. As shown in FIG. 12, an ending selection screen 1200 is displayed. The illustrated ending selection screen 1200 includes six endings, each with an image and a description. Although the appearance of the interactive voting skin 900 has changed, the functionality remains the same. That is, instead of the selectable item being a contestant, the selectable item is an ending to a television show, movie, or other media.

Each ending can be assigned a specific character string that is used for the message body of an SMS message, for example. A destination number can also be assigned. The pre-determined character string and destination numbers can be assigned by the voting system 122, the television network 134, or another entity. These assignments can be integral to the interactive voting skin 900 and can be updated periodically, for example, for each episode of a television series.

The ending selection screen 1200 does not have to be limited to the number of endings shown. Instead, the ending selection screen 1200 can include any number of endings and they can be displayed in any layout. The endings can also be presented in any style. For cases in which the number of endings loaded exceeds the viewable measurements of the display 204, a horizontal and/or vertical scroll feature can be implemented to allow access to these contacts. This scroll feature can be made operable by a scroll wheel (not shown) or a key on MD 200.

Figure 13:
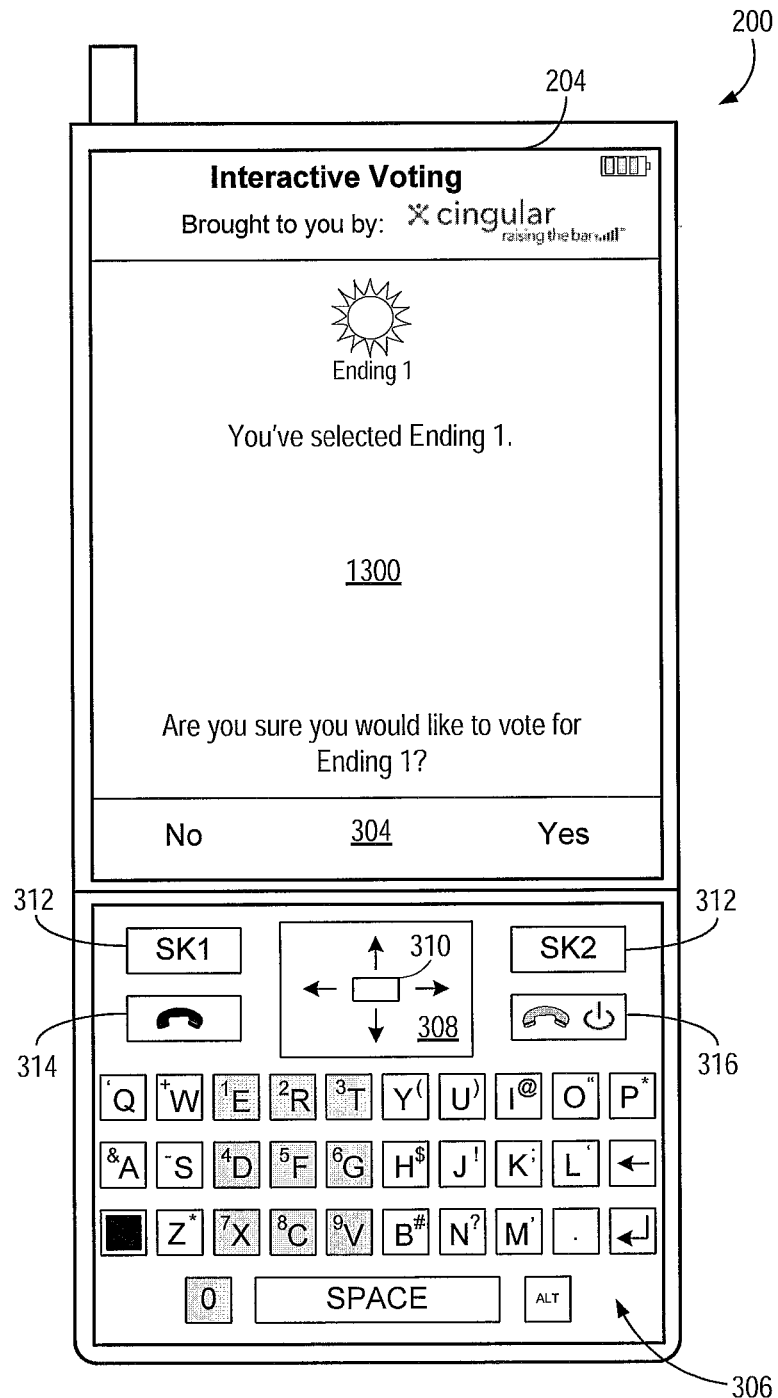
FIG. 13 illustrates a mobile device that includes a confirmation screen, according to the present invention.

The user can select, via any means for selection, one or more endings from the ending selection screen 1200. After the contact(s) is selected, the user can be presented with a confirmation screen 1300, as shown in FIG. 13. The confirmation screen 1300 can include the selected ending(s) and can provide soft keys to confirm or not confirm the user's selection. After the user confirms the vote, the user can be presented with a notification 1100, as shown in FIG. 11. The notification 1100 may inform the user that the vote is being sent and/or that the vote was sent.

Figure 14:
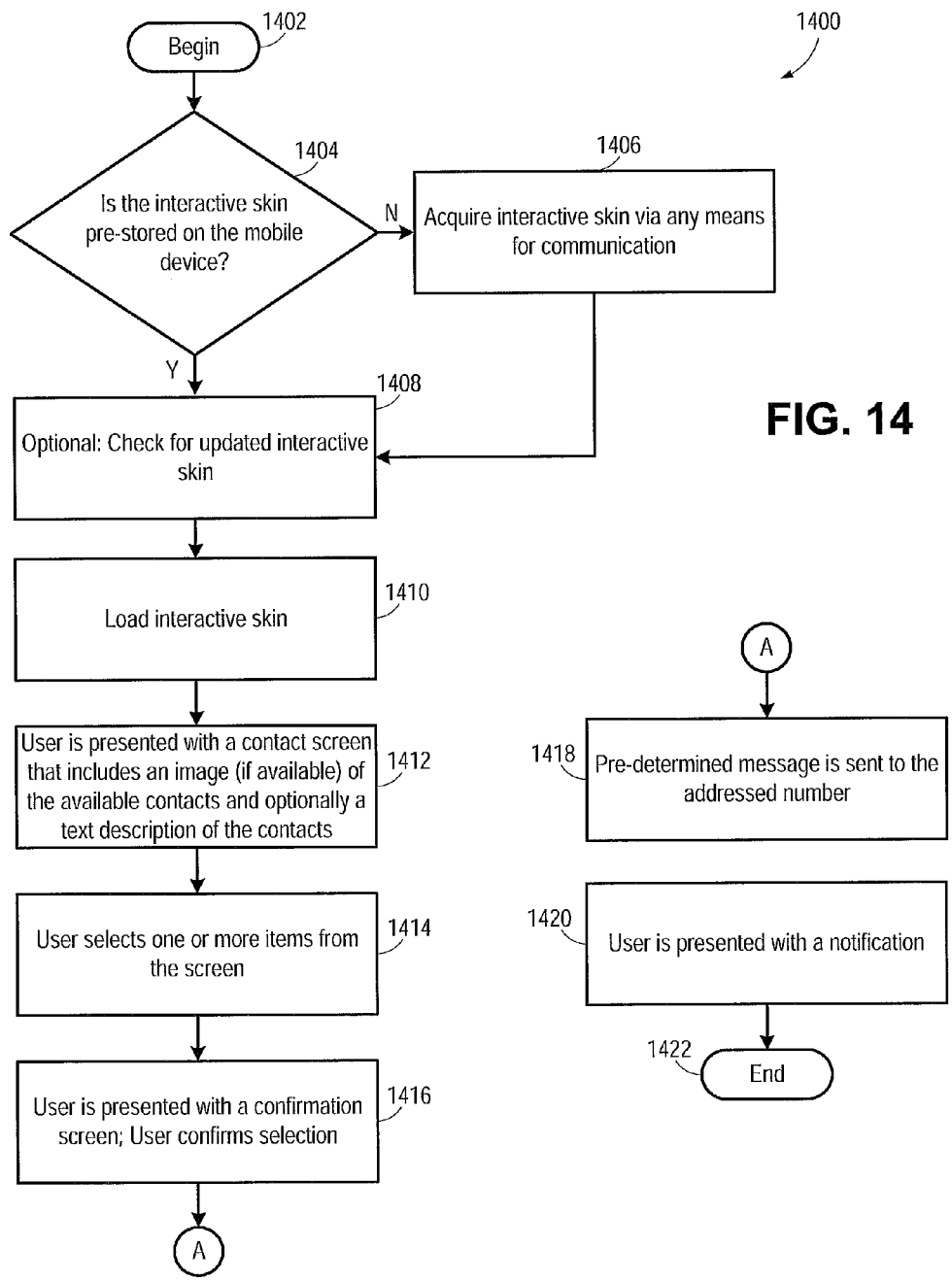
FIG. 14 illustrates an exemplary method for sending a vote utilizing an interactive voting skin, according to the present invention.

Referring now to FIG. 14, an exemplary method 1400 for sending a message utilizing the interactive voting skin 900 is shown. It should be understood that the steps described herein with reference to FIG. 14 are not limited to the order shown.

The exemplary method 1400 begins at step 1402 and proceeds to step 1404, wherein it is determined if the interactive voting skin 900 is pre-stored in a memory of MD 200, for example, in external/removable memory 218 and/or internal memory 220. The interactive voting skin 900 may have been pre-loaded onto the mobile device by the manufacturer or may have been acquired by the user at an earlier date.

If the interactive voting skin 900 is not pre-stored on the MD, the interactive voting skin 900 can be acquired through any means for communications 132 at step 1406. After the interactive voting skin 900 is acquired, it can be stored in the memory 218, 220. The method 1400 then proceeds to optional step 1408, wherein a check is performed to determine if the interactive voting skin 900 received through means for communication 132 was in fact the latest version available. If not, the interactive voting skin 900 is updated.

If, at step 1404, it is determined that the interactive voting skin 900 is pre-stored, then the method 1400 proceeds to optional step 1408, wherein a check is performed to determine if the MD 200 has the latest version of the interactive voting skin 900. If not, the interactive voting skin 900 is updated.

After the interactive voting skin 900 is acquired and/or updated, the method 1400 then proceeds to step 1410, wherein the interactive voting skin 900 is loaded. Upon first load of the interactive voting skin 900, a setup menu (not shown) may be displayed. The setup menu may be configured to accept a user's input with regard to a number of user preferences. The setup menu may also be accessible by the user on subsequent uses of the interactive voting skin 900.

After the interactive voting skin 900 is loaded in step 1410, the method 1400 proceeds to step 1412, wherein the interactive voting skin 900 populates a contestant selection screen 902 or an ending selection screen 1200 with the available contestant or endings and their corresponding assignments for message and destination number. The user may then select one or more contestants or endings via the respective screen at step 1414.

At step 1416, the user can be presented with a confirmation screen 1000, 1300 and at step 1418 the predetermined message is sent to the addressed number. The user can be presented with a notification that the vote was sent at step 1420. The method 1400 ends at step 1422.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A mobile device, comprising:
   a transceiver;
   an input interface;
   a display;
   a processor; and
   a memory comprising instructions that, when executed by the processor, cause the processor to perform operations comprising:
      receiving, via the transceiver, a plurality of selections;
      storing the plurality of selections wherein each of the plurality of selections is represented as an image for presentation on the display, each of the plurality of selections is associated with one of a plurality of contestants appearing on a media program, each of the plurality of selections has a destination number and a message body associated therewith, and the message body of each of the plurality of selections is populated with a keyword used to establish a vote for one of the plurality of contestants;
      presenting the images of the plurality of selections on the display;
      receiving a selection via the input interface of one of the images, the selection being representative of a vote for a selected contestant of the plurality of contestants that is associated with the selected image;
      generating, in response to receiving the selection of one of the images, a short message service message, the short message service message comprising the destination number and the message body corresponding to the selected contestant; and
      transmitting the short message service message to a voting system via the transceiver to submit the vote for the selected contestant;
   wherein:
      the operation of receiving the plurality of selections comprises receiving the plurality of selections via a terminal selected from a group consisting of a television, a set-top box, and a kiosk that is in communication with the mobile device;
      the plurality of selections is part of a base interactive voting application; and
      the operations further comprise receiving an update, for the base interactive voting application, comprising at least one particular instruction selected from a group consisting of a delete instruction to delete one of the plurality of selections and an add instruction to add a new selection to the plurality of selections.

2. The mobile device of claim 1, wherein the destination number for each of the plurality of selections identifies one of the plurality of contestants to the voting system to ensure the vote is submitted for the selected contestant.

3. The mobile device of claim 1, wherein the destination number for each of the plurality of selections identifies the voting system and the message body identifies one of the plurality of contestants to the voting system to ensure the vote is submitted for the selected contestant.

4. The mobile device of claim 1, wherein the operations further comprise receiving the plurality of selections via the transceiver prior to storing the plurality of selections.

5. A method for voting via a mobile device, comprising:
   receiving, via a transceiver of the mobile device, a plurality of selections;
   storing, in a memory of the mobile device, the plurality of selections, wherein each of the plurality of selections is represented as an image for presentation on a display of the mobile device, each of the plurality of selections is associated with one of a plurality of contestants appearing on a media program, each of the plurality of selections has a destination number and a message body associated therewith, and the message body of each of the plurality of selections is populated with a keyword used to establish a vote for one of the plurality of contestants;

presenting the images of the plurality of selections on the display;

receiving, via an input interface of the mobile device, a selection of one of the images, the selection being representative of a vote for a selected contestant of the plurality of contestants that is associated with the selected image;

generating, in response to receiving the selection of one of the images, by the mobile device, a short message service message, the short message service message comprising the destination number and the message body corresponding to the selected contestant; and transmitting, via the transceiver of the mobile device, the short message service message to a voting system to submit the vote for the selected contestant;

wherein:

receiving the plurality of selections comprises receiving the plurality of selections via a terminal selected from a group consisting of a television, a set-top box, and a kiosk that is in communication with the mobile device;

the plurality of selections is part of a base interactive voting application; and the method further comprises receiving an update, for the base interactive voting application, comprising at least one particular instruction selected from a group consisting of a delete instruction to delete one of the plurality of selections and an add instruction to add a new selection to the plurality of selections.

6. The method of claim 5, wherein the generating comprises generating, by the mobile device, the short message service message comprising the destination number and the message body, wherein the destination number for each of the plurality of selections identifies one of the plurality of contestants to the voting system to ensure the vote is submitted for the selected contestant.

7. The method of claim 5, wherein the generating comprises generating, by the mobile device, the short message service message comprising the destination number and the message body, wherein the destination number for each of the plurality of selections identifies the voting system and the message body identifies one of the plurality of contestants to the voting system to ensure the vote is submitted for the selected contestant.

8. A tangible computer-readable storage device comprising computer-executable instructions that, when executed by a processor, cause the processor to perform operations comprising:

receiving, via a transceiver of a mobile device, a plurality of selections;

storing the plurality of selections in the computer-readable medium, wherein each of the plurality of selections is represented as an image for presentation on a display of the mobile device, each a plurality of selections is associated with one of a plurality of contestants appearing on a media program, each of the plurality of selections has a destination number and a message body associated therewith, and the message body of each of the plurality of selections is populated with a keyword used to establish a vote for one of the plurality of contestants;

presenting the images of the plurality of selections on the display;

receiving, via an input interface of the mobile device, a selection of one of the images, the selection being representative of a vote for a selected contestant of the plurality of contestants that is associated with the selected image;

generating, in response to receiving the selection of one of the images, a short message service message, the short message service message comprising the destination number and the message body corresponding to the selected contestant; and transmitting, via the transceiver of the mobile device, the short message service message to a voting system to submit the vote for the selected contestant;

wherein:

the operation of receiving the plurality of selections comprises receiving the plurality of selections via a terminal selected from a group consisting of a television, a set-top box, and a kiosk that is in communication with the mobile device;

the plurality of selections is part of a base interactive voting application; and the operations further comprise receiving an update, for the base interactive voting application, comprising at least one particular instruction selected from a group consisting of a delete instruction to delete one of the plurality of selections and an add instruction to add a new selection to the plurality of selections.

9. The tangible computer-readable storage device of claim 8, wherein the destination number for each of the plurality of selections identifies one of the plurality of contestants to the voting system to ensure the vote is submitted for the selected contestant.

10. The tangible computer-readable storage device of claim 8, wherein the destination number for each of the plurality of selections identifies the voting system and the message body identifies one of the plurality of contestants to the voting system to ensure the vote is submitted for the selected contestant.

11. A mobile device, comprising:

a transceiver;

an input interface;

a display;

a processor; and a memory comprising instructions that, when executed by the processor, cause the processor to perform operations comprising:

receiving, via the transceiver, a plurality of selections;

storing the plurality of selections, wherein each of the plurality of selections is represented as an image for presentation on the display, each of the plurality of selections is associated with one of a plurality of endings for a broadcast, each of the plurality of selections has a destination number and a message body associated therewith, and the message body of each of the plurality of selections is populated with a keyword used to establish a vote for one of the plurality of endings;

presenting the images of the plurality of selections on the display;

receiving a selection, via the input interface, of one of the images, the selection being representative of a vote for a selected ending of the plurality of endings that is associated with the selected image;

generating, in response to receiving the selection of one of the images, a short message service message, the short message service message comprising the destination number and the message body corresponding the selecting ending; and transmitting the short message service message to a voting system via the transceiver to submit the vote for the selected ending;

wherein:
the operation of receiving the plurality of selections comprises receiving the plurality of selections via a terminal selected from a group consisting of a television, a set-top box, and a kiosk that is in communication with the mobile device;

the plurality of selections is part of a base interactive voting application; and the operations further comprise receiving an update, for the base interactive voting application, comprising at least one particular instruction selected from a group consisting of a delete instruction to delete one of the plurality of selections and an add instruction to add a new selection to the plurality of selections.

12. The mobile device of claim 11, wherein the destination number for each of the plurality of selections identifies one of the plurality of endings to the voting system to ensure the vote is submitted for the selected ending.

13. The mobile device of claim 11, wherein the destination number for each of the plurality of selections identifies the voting system and the message body identifies one of the plurality of endings to the voting system to ensure the vote is submitted for the selected ending.

14. The mobile device of claim 11, wherein the broadcast is selected from a group consisting of a television show, a movie, a televised sporting event, a news show, and an interactive video game.

15. A method, for voting via a mobile device, comprising:
receiving, via transceiver of the mobile device, a plurality of selections;
storing, in a memory of the mobile device, the plurality of selections, wherein each of the plurality of selections is represented as an image for presentation on a display of the mobile device, each of the plurality of selections is associated with one of a plurality of endings for a broadcast, each of the plurality of selections has a destination number and a message body associated therewith, and the message body of each of the plurality of selections is populated with a keyword used to establish a vote for one of the plurality of endings;
presenting the images of the plurality of selections on the display;
receiving, via an input interface of the mobile device, a selection of one of the images, the selection being representative of a vote for a selected ending of the plurality of endings that is associated with the selected image;
generating, in response to receiving the selection of one of the images, by the mobile device, a short message service message, the short message service message comprising the destination number and the message body corresponding to the selected ending; and
transmitting, via the transceiver of the mobile device, the short message service message to a voting system to submit the vote for the selected ending;
wherein:
receiving the plurality of selections comprises receiving the plurality of selections via a terminal selected from a group consisting of a television, a set-top box, and a kiosk that is in communication with the mobile device;

the plurality of selections is part of a base interactive voting application; and the method further comprises receiving an update, for the base interactive voting application, comprising at least one particular instruction selected from a group consisting of a delete instruction to delete one of the plurality of selections and an add instruction to add a new selection to the plurality of selections.

16. The method of claim 15, wherein the generating comprises generating, by the mobile device, the short message service message comprising the destination number and the message body, wherein the destination number for each of the plurality of selections identifies one of the plurality of endings to the voting system to ensure the vote is submitted for the selected ending.

17. The method of claim 15, wherein the generating comprises generating, by mobile device, the short message service message comprising the destination number and the message body, wherein the destination number for each of the plurality of selections identifies the voting system and the message body identifies one of the plurality of endings to the voting system to ensure the vote is submitted for the selected ending.

18. The method of claim 15, wherein the broadcast is selected from a group consisting of a television show, a movie, a televised sporting event, a news show, and an interactive game.

19. A tangible computer-readable storage device comprising computer-executable instructions that, when executed by a processor, cause the processor to perform operations comprising:
receiving, via a transceiver of a mobile device, a plurality of selections;
storing the plurality of selections in the computer-readable medium, wherein each of the plurality of selections is represented as an image for presentation on a display of the mobile device, each of the plurality of selections is associated with one of a plurality of endings for a broadcast, each of the plurality of selections has a destination number and a message body associated therewith, and the message body is populated with a keyword used to establish a vote for one of the plurality of endings;
presenting the images of the plurality of selections on the display;
receiving, via in input interface of the mobile device, a selection of one of the images, the selection being representative of a vote for a selected ending of the plurality of endings that is associated with the selected image;
generating, in response to receiving the selection of one of the images, a short message service message, the short message service message comprising the destination number and the message body corresponding to the selected ending; and
transmitting, via the transceiver of the mobile device, the short message service message to a voting system to submit the vote for the selected ending;
wherein:
the operation of receiving the plurality of selections comprises receiving the plurality of selections via a terminal selected from a group consisting of a television, a set-top box, and a kiosk that is in communication with the mobile device;
the plurality of selections is part of a base interactive voting application; and the operations further comprise receiving an update, for the base interactive voting application, comprising at least one particular instruction selected from a group consisting of a delete instruction to delete one of the plurality of selections and an add instruction to add a new selection to the plurality of selections.

20. The tangible computer-readable storage device of claim 19, wherein the destination number for each of the plurality of selections identifies one of the plurality of endings to the voting system to ensure the vote is submitted for the selected ending.

21. The tangible computer-readable storage device of claim 19, wherein the destination number for each of the plurality of selections identifies the voting system and the message body identifies one of the plurality of endings to the voting system to ensure the vote is submitted for the selected ending.

22. The tangible computer-readable storage device of claim 19, wherein the broadcast is selected from a group consisting of a television show, a movie, a televised sporting event, a news show, and an interactive video game.

\* \* \* \* \*